United States Patent [19]

Iino et al.

[11] Patent Number: 4,929,854
[45] Date of Patent: May 29, 1990

[54] CLOCK CIRCUIT HAVING A CLOCKED OUTPUT BUFFER

[75] Inventors: Hideyuki Iino, Yokohama; Akihiro Yoshitake, Kawasaki; Hidenori Hida, Yokohama, all of Japan

[73] Assignees: Fujitsu Limited; Fujitsu Microcomputer Systems Limited, both of Kawasaki, Japan

[21] Appl. No.: 335,260

[22] Filed: Apr. 10, 1989

[30] Foreign Application Priority Data

Apr. 15, 1988 [JP] Japan .................................. 63-93837

[51] Int. Cl.⁵ .......................................... H03K 19/096
[52] U.S. Cl. .................................... 307/480; 307/452; 307/475; 307/481; 307/269
[58] Field of Search ................................. 307/451–455, 307/443, 475, 480–481, 269, 272.2

[56] References Cited

U.S. PATENT DOCUMENTS

| | | | |
|---|---|---|---|
| 4,035,663 | 7/1977 | Stodola | 307/480 X |
| 4,420,696 | 12/1983 | Gemma et al. | 307/480 X |
| 4,604,731 | 8/1986 | Konishi | 307/475 X |
| 4,719,365 | 1/1988 | Misono | 307/480 X |
| 4,751,407 | 6/1988 | Powell | 307/452 X |
| 4,797,573 | 1/1989 | Ishimoto | 307/269 |
| 4,816,700 | 3/1989 | Imel | 307/480 X |
| 4,843,254 | 6/1989 | Motegi et al. | 307/272.2 |
| 4,866,310 | 9/1989 | Ando et al. | 307/269 X |

*Primary Examiner*—David Hudspeth
*Attorney, Agent, or Firm*—Armstrong, Nikaido, Marmelstein, Kubovcik & Murray

[57] ABSTRACT

A semiconductor integrated circuit device includes an internal logic circuit for carrying out a logic operation and generating an output signal based on the logic operation, and an output buffer circuit connected to the internal logic circuit, for outputting the output signal through an output terminal in synchronism with a clock signal. The semiconductor integrated circuit also includes a non-overlap clock generator, and a third-clock generator. The non-overlap clock generator generates a first internal clock signal which falls in synchronism with a falling edge of an external clock signal, and generates a second internal clock signal which falls in synchronism with a rising edge of the external clock signal, the internal logic circuit carrying out the logic operation in synchronism with the first and second internal clock signals. The third-clock generator generates a third internal clock which rises in synchronism with the falling edge of the second internal clock signal and which falls in synchronism with the falling edge of the first internal clock signal, the third internal clock being supplied, as the clock signal, to the output buffer circuit.

14 Claims, 10 Drawing Sheets

NON-OVERLAP SECTION

CLOCK CIRCUIT HAVING A CLOCKED OUTPUT BUFFER

BACKGROUND OF THE INVENTION

The present invention generally relates to a semiconductor integrated circuit device, and more particularly to a semiconductor integrated circuit device having a circuit which generates an internal clock signal used for outputting data to an external circuit through an output buffer.

Generally, data generated in a large scale integrated circuit device (hereafter simply referred to as an LSI device) such as a microcomputer is output to an external circuit through a built-in output buffer which is controlled by an internal clock signal generated in the LSI device.

Most of LSI-devices such as a direct memory access controller have an internal clock generator, which generates internal clock signals from an external clock signal supplied thereto from an external device. The generated internal clock signals are used to define timing of operation in an internal logic circuit and input and output buffers which interface with external devices. Generally, internal clock generators generate two internal clock signals which do not overlap each other in view of timing. In order to generate the internal clock signals from the external clock signal, an internal clock generator includes a flip-flop and a delay line. Precision in timing of the internal clock signals depends on precision in the delay line.

Generally, one of the generated internal clock signals is used for defining operation timing of an output buffer. Therefore, the operation timing of the output buffer depends on precision in the delay line provided in the internal clock generator. It is noted that it is very difficult to form a stabilized delay line so as to always provide a fixed delay amount. In other words, actual delay lines have variations in electric characteristics. It follows that operation of the output buffer driven by the internal clock signal thus generated is unstable, and therefore the reliability thereof is not high. Additionally, with the above-mentioned structure, it is very difficult to obtain satisfactory alternating current characteristics (hereafter simply referred to as AC characteristics) with respect to signal transfer characteristics and the like.

SUMMARY OF THE INVENTION

It is therefore a general object of the present invention to provide a novel and useful semiconductor integrated circuit device in which the above-mentioned disadvantages are eliminated.

A more specific object of the present invention to provide a semiconductor integrated circuit device having an extremely stabilized output buffer by generating an internal clock signal by an improved internal clock generator.

The above objects of the present invention can be achieved by a semiconductor integrated circuit device comprising internal logic means for carrying out a logic operation and generating an output signal based on the logic operation; output buffer means, connected to the internal logic means, for outputting the output signal through an output terminal in synchronism with a clock signal; first means for generating a first internal clock signal which falls in synchronism with a falling edge of an external clock signal and for generating a second internal clock signal which falls in synchronism with a rising edge of the external clock signal, the internal logic means carrying out the logic operation in synchronism with the first and second internal clock signals; and second means, connected to the first means, for generating a third internal clock which rises in synchronism with the falling edge of the second internal clock signal and which falls in synchronism with the falling edge of the first internal clock signal, the third internal clock signal being supplied, as the clock signal, to the output buffer means.

The other objects, features and advantages of the present invention will become apparent from the following detailed description when read in conjunction with the accompanying drawings.

DETAILED DESCRIPTION

A description is first given of a conventional output buffer and a conventional internal clock generator in order to facilitate the understanding of the present invention.

Figure 1:
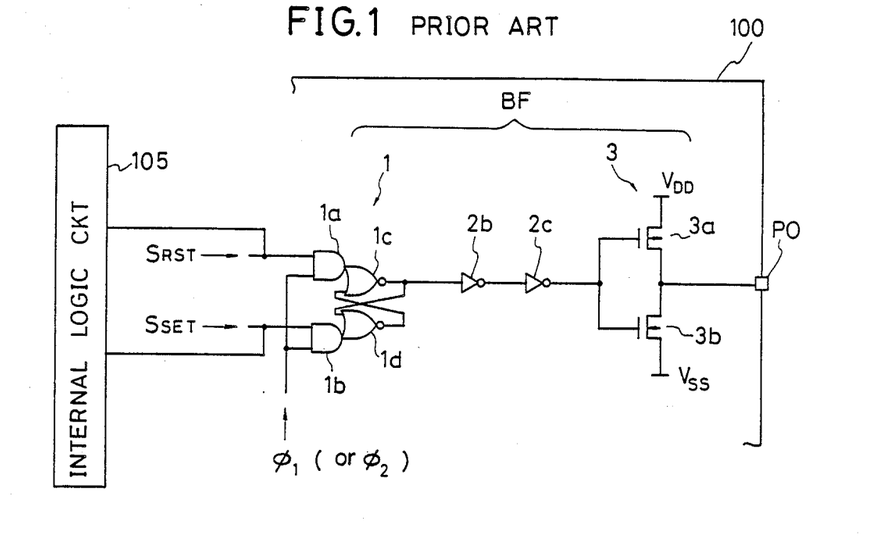
FIG. 1 is a circuit diagram of a conventional output buffer provided in LSI devices.

FIG. 1 illustrates an output buffer circuit BF formed on a semiconductor chip 100. The output buffer circuit BF includes a flip-flop 1, which connected to an internal logic circuit 105 and is made up of two AND gates 1a, 1b, and two NOR gates 1c, 1d. When an output set signal $S_{SET}$ is applied to the flip-flop 1, it is set with a timing of the rising edge of a first internal clock signal $\phi_1$ (or a second internal clock signal $\phi_2$). Then, the flip-flop 1 drives an N-channel transistor 3b of an output buffer 3 through two inverters 2b and 2c connected in series. Thereby, an output terminal PO is set to a low level (hereafter simply referred to as "L" or "L" level).

On the other hand, when an output reset signal $S_{RST}$ is applied to the flip-flop 1, it is reset with a timing of the rising edge of the first internal clock signal $\phi_1$ (or the second internal clock signal $\phi_2$). Then, the flip-flop 1 drives a P-channel transistor 3a of the output buffer 3 through the inverters 2b and 2c. Thereby, the output terminal PO is set to a high level (hereafter simply referred to as "H" or "H" level).

In this manner, the output set and reset signals $S_{SET}$ and $S_{RST}$ which are supplied to the flip-flop 1 with an arbitrary timing or a predetermined timing, are synchronized with the first internal clock signal $\phi_1$ (or the second internal clock signal $\phi_2$). Thereafter, the output set and reset signals $S_{SET}$ and $S_{RST}$ are output as output signals through the output terminal PO. In the case of FIG. 1, the output set and reset signals $S_{SET}$ and $S_{RST}$ are controlled with the same timing of the first internal clock signal $\phi_1$ (or $\phi_2$). In the alternative, it is possible to control the output set signal $S_{SET}$ with the timing of the first internal clock signal $\phi_1$ and control the output reset signal $S_{RST}$ with the timing of the second internal clock signal $\phi_2$, or vice versa.

Figure 2:
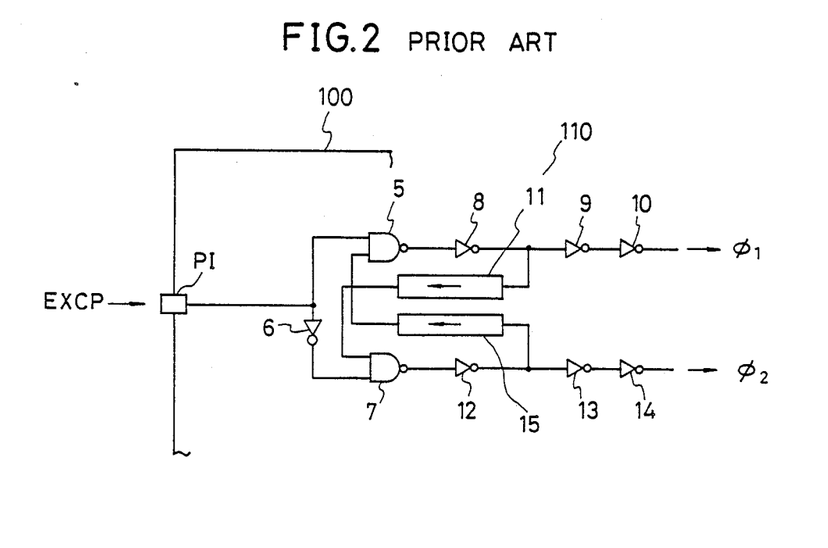
FIG. 2 is a circuit diagram of a conventional internal clock generator.

FIG. 2 illustrates a non-overlap internal clock generator (hereafter referred to as a non-overlap clock generator) 110. An external clock signal EXCP is applied to an NAND gate 5 through an external input terminal PI formed on the semiconductor chip 100. The external clock signal EXCP is also supplied to an NAND gate 7 through an inverter 6. An output signal of the NAND gate 5 is extracted as the aforementioned first internal clock signal $\phi_1$ through inverters 8, 9 and 10. The output signal of the NAND gate 5 is also supplied to a first delay circuit 11 through the inverter 8. The delay circuit 11 has a function of delaying the output signal of the inverter 8 by a predetermined time Td1. The output signal of the delay circuit 11 is supplied to the NAND gate 7. On the other hand, an output signal of the NAND gate 7 is extracted as the aforementioned second clock signal $\phi_2$ through inverters 12, 13 and 14. The output signal of the NAND gate 7 is also supplied to a second delay circuit 15 through the inverter 12. The second delay circuit 15 has a functions of the output signal of the inverter 12 by a predetermined time Td2. The output signal of the second delay circuit 15 is supplied to the NAND gate 5.

Figure 3:
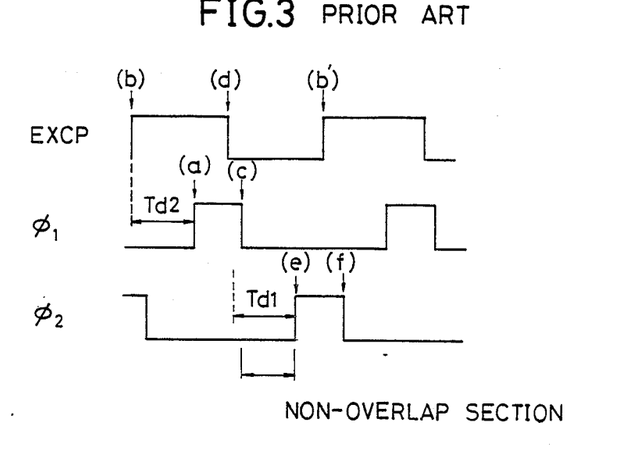
FIG. 3 is a view illustrating waveforms of first and second internal clocks and an external clock.

With the structure of FIG. 3, the rise (a) of the first internal clock signal $\phi_1$ is delayed by the time Td2 from the rise (b) of the external clock signal EXCP, and the fall (c) of the first internal clock signal $\phi_1$ is synchronized with the fall (d) of the external clock signal EXCP. On the other hand, the rise (e) of the second internal clock signal $\phi_2$ is delayed by the time Td1 from the fall (d) of the external clock signal EXCP, and the fall (f) of the second internal clock signal $\phi_2$ is synchronized with the rise (b') of the external clock signal EXCP. In the above description, delays resulting from the NAND gates 5 and 7, and the inverters 8 through 10, and 12 through 14 are neglected for convenience's sake. There is formed a non-overlap interval between the first and second internal clocks $\phi_1$ and $\phi_2$ due to the presence of the delays Td1 and Td2.

However, precision in determination of the output signal (corresponding to the output set signal $S_{SET}$) depends on precision in the delay time Td1 or Td2, because the output buffer circuit is synchronized with the first or second internal clock signal $\phi_1$ or $\phi_2$, which is generated by use of the delay circuits 11 and 15. The above prevents an improvement in AC characteristics, particularly signal transfer characteristics. Additionally, it is not easy to design a system in case where the AC characteristics of devices determined based on the external clock are deteriorated.

Figure 4:
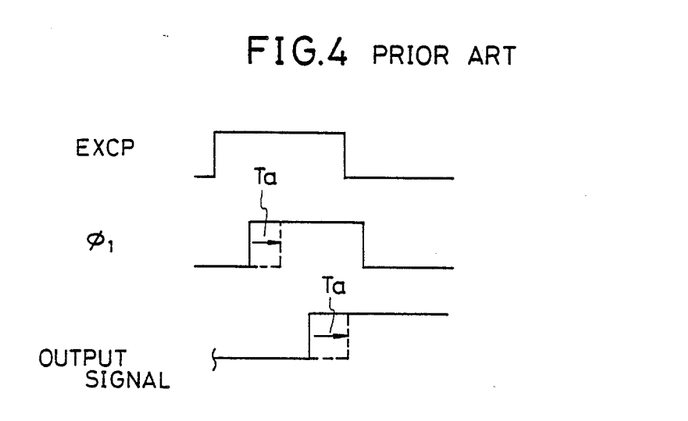
FIG. 4 is a view illustrating problems encountered in the conventional output buffer shown in FIG. 1.

The above is further described with reference to FIG. 4. Referring to FIG. 4, the output signal supplied from the internal logic circuit 105 is synchronized with the first internal clock signal $\phi_1$ (or $\phi_2$), and is output through the external terminal PO with the predetermined delay time depending on transfer characteristics of the inverters 2b, 2c and the output buffer 3. The rise of the first internal clock signal $\phi_1$ is delayed by the delay time Td2 from the rise of the external clock signal EXCP (see FIG. 3). Therefore, if an error exists in characteristics of the second delay circuit 15, and the delay time Td2 is further delayed by a predetermined time Ta, the output signal is settled (determined) with a further delay due to the time Ta. As a result, AC characteristics of the output buffer circuit are deteriorated by the time Ta. It is conceivable to directly use the external clock signal EXCP in place of the first and second internal clock signals $\phi_1$ and $\phi_2$. However, since the output set signal $S_{SET}$ and output reset signal $S_{RST}$ are generated by using the first and second internal clock signals $\phi_1$ and $\phi_2$, there occurs the difference between the external clock signal EXCP and the internal clock signals $\phi_1$ and $\phi_2$. Additionally, as the non-overlap period increases, the AC characteristics are deteriorated. Further, there is a possibility that the next internal clock signal is supplied to a logic circuit (not shown) used for generating the output set and reset signals $S_{SET}$ and $S_{RST}$, when conditions on determination of the signals $S_{SET}$ and $S_{RST}$ have not yet been determined due to a skew resulting from the number of logic elements which construct the logic circuit. In this time, if the external clock signal is supplied to the output buffer circuit, an error in operation occurs. Therefore, the direct use of the external clock signal is not appropriate in view of reliability of the output buffer circuit.

The present invention intends to overcome the above-mentioned disadvantages of the conventional art.

Figure 5:
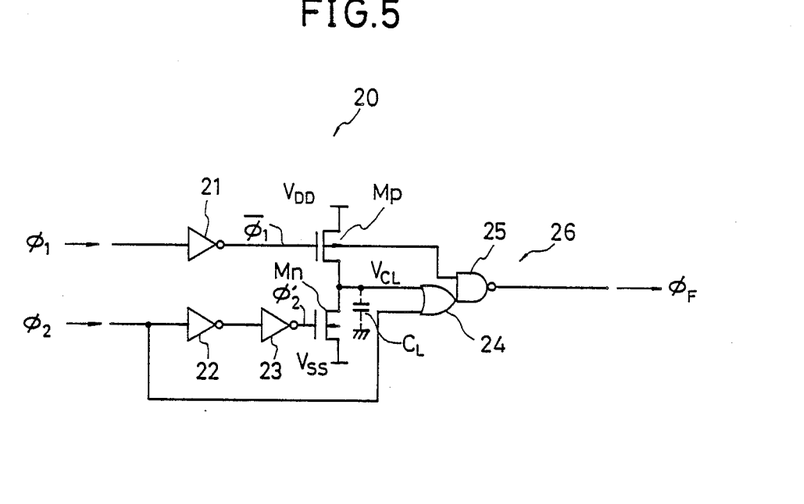
FIG. 5 is a circuit diagram of an essential part of a preferred embodiment of the present invention.

A description is given of a preferred embodiment of the present invention with reference to FIG. 5. FIG. 5 illustrates a third-internal-clock generator 20 (hereafter simply referred to as a third-clock generator), which generates a third internal clock signal $\phi_F$ from the aforementioned first and second internal clock signals $\phi_1$ and $\phi_2$. The third-clock generator 20 includes inverters 21, 22, and 23, a P-channel MOS transistor (hereafter simply referred to as a PMOS transistor) Mp, an N-channel MOS transistor (hereafter simply referred to as an NMOS transistor) Mn, an OR gate 24, and a NAND gate 25. The inverter 21 inverts the first clock signal $\phi_1$ and thereby generates an inverted first clock signal $\overline{\phi}_1$. The PMOS transistor Mp conducts in an "L"-level interval of the inverted first clock signal $\overline{\phi}_1$ (corresponding to an "H"-level interval of the first clock signal $\phi_1$). Two series-connected inverters 22 and 23 inverts the second internal clock signal $\phi_2$ two times, and generates a clock signal $\phi_2'$. The NMOS transistor Mn conducts in an "H"-level interval of the clock signal $\phi_2'$ (corresponding to an "H"-level interval of the second internal clock signal $\phi_2$). The drains of the PMOS and NMOS transistors Mp and Mn are connected to the OR gate 24, to which the second internal clock signal $\phi_2$ is supplied. The source of the PMOS transistor is connected to a positive power source $V_{DD}$ and the source of the NMOS transistor Mn is connected to a negative power source $V_{SS}$. The gate of the PMOS transistor Mp is connected to the NAND gate 25, which is also connected to the output of the OR gate 24. A composite gate 26 is constructed by the OR gate 24 and the NAND gate 25.

The PMOS transistor Mp charges a capacitive load $C_L$ up to a voltage equal to $V_{DD}-V_{TH,P}$ where $V_{TH,P}$ is a threshold voltage of the PMOS transistor Mp, only when the PMOS transistor Mp conducts. On the other hand, only when the NMOS transistor Mn conducts, the capacitive load $C_L$ is discharged down to almost the voltage $V_{SS}$. The capacitive load $C_L$ is a purely capacitive load such as input gate capacitance, stray capacitance and parasitic capacitance coupled to the OR gate 24. The composite gate 26 outputs a third internal clock signal $\phi_F$, when $\overline{\phi_1}$="H", and $\phi_2$="H" or $V_{CL}$="H" where $V_{CL}$ is the potential of the capacitive load $C_L$.

Figure 6:
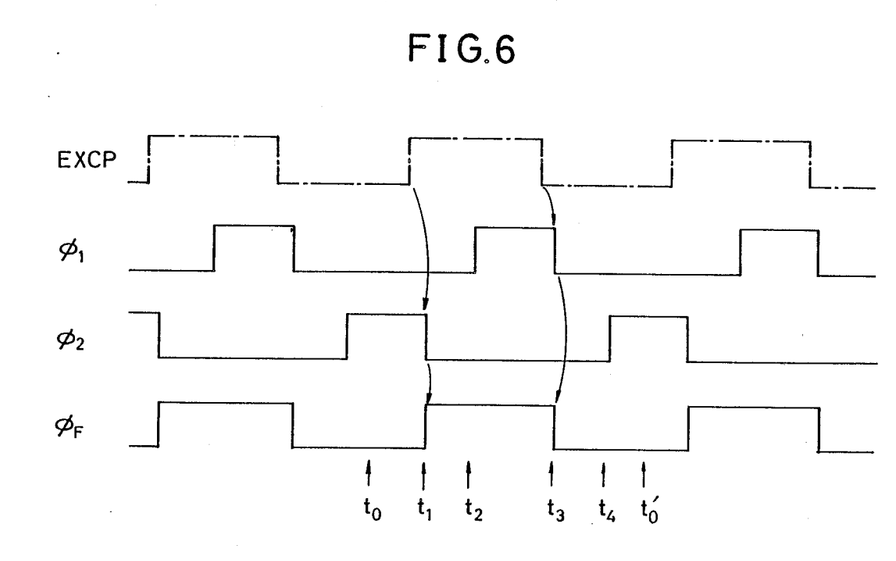
FIG. 6 is a view illustrating waveforms of signals observed in the embodiment of FIG. 5.

A description is given of operation of the circuit of FIG. 5 with reference to FIG. 6. In the following description, it is assumed that a delay time occurring in each of the gates is zero for convenience' sake.

At time $t_0$, the first internal clock signal $\phi_1$ is "L", and the second internal clock signal $\phi_2$ is "H". Therefore, at this time, the PMOS Mp is OFF, and the NMOS transistor Mn is ON. Thereby, the capacitive load $C_L$ is kept in the discharged state, and thus $V_{CL} \approx V_{SS}$ (that is, $V_{CL}$="L"). At this time, the composite gate 26 is supplied with the inverted first clock signal $\overline{\phi_1}$ held at "H" and the second internal clock signal $\phi_2$ held at "H". Therefore, the composite gate 26 outputs the third internal clock signal $\phi_F$ held at "L".

At time $t_1$, the second internal clock signal $\phi_2$ is switched from "H" to "L". The composite gate 26 is supplied with the inverted first clock signal $\overline{\phi_1}$ held at "H", the potential signal $V_{CL}$ held at "L", and the second internal clock signal $\phi_2$ switched to "L". Therefore, the third internal clock signal $\phi_F$ derived from the composite gate 26 is switched from "L" to "H". That is, the rising edge of the third internal clock signal $\phi_F$ is synchronized with the falling edge ("H" to "L") of the second internal clock signal $\phi_2$. As described previously, the falling edges of the second internal clock signal $\phi_2$ are generated in synchronism with the rising edges of the external clock signal EXCP without using the rising edges of the first and second internal clock signals $\phi_1$ and $\phi_2$. Additionally, no specific delay circuit is used for generating the third internal clock signal $\phi_F$. For these reasons, it becomes possible to obtain, with high precision, the rising edges of the third internal clock signal $\phi_F$ occurring in synchronism with the falling edges of the second internal clock signal $\phi_2$.

At an interval between time $t_1$ and $t_2$, during a time when $\phi_1$="L", and $\phi_2$="L", the PMOS transistor Mp is OFF, and the NMOS transistor Mn is OFF. Therefore, the composite gate 26 is supplied with the inverted first clock signal $\overline{\phi_1}$ held at "H", the potential signal $V_{CL}$ held at "L", and the second internal clock signal $\phi_2$ held at "L". As a result, the composite gate 26 outputs the third internal clock signal held at "H". When the first internal clock signal $\phi_1$ is changed from "L" to "H" at time $t_2$, the inverted first clock signal $\overline{\phi_1}$ is switched from "H" to "L". Thereby, the PMCS transistor Mp is allowed to conduct. Then, the capacitive load $C_L$ is charged up to approximately the potential $V_{DD}$ so that $V_{CL}$="H". At this time, the inverted first clock signal $\overline{\phi_1}$ held at "L" is applied to the composite gate 26, which thus keeps the third internal clock signal at "H".

At an interval between $t_2$ and $t_3$, the third internal clock signal $\phi_F$ is kept at "H", because the inverted first clock signal $\overline{\phi_1}$ is "L".

At time $t_3$, the first internal clock signal $\phi_1$ is switched from "H" to "L", and thereby the PMOS transistor Mp is turned OFF. At this time, since $\phi_2$="L", the NMOS transistor Mn is OFF, and the potential $V_{CL}$ is kept at "H" level. Then, the composite gate 26 is supplied with the inverted first clock signal $\overline{\phi_1}$ held at "H" and the potential $V_{CL}$ held at "H". Therefore, the third internal clock signal $\phi_F$ is switched from "H" to "L". That is, the falling edge of the third clock signal $\phi_F$ is synchronized with the falling edge of the first internal clock signal $\phi_1$. It is noted that the falling edges of the first internal clock signal $\phi_1$ are generated in synchronism with the falling edges of the external clock signal EXCP without using the rising edges of the first and second internal clock signals $\phi_1$ and $\phi_2$, and that no specific delay circuit is used for generating the third internal clock signal $\phi_F$. Therefore, the falling edges of the third internal clock $\phi_F$ depend on precision in the external clock signal EXCP. Thereby, it becomes possible to obtain the falling edge of the third internal clock signal $\phi_F$ occurring in synchronism with the falling edges of the first internal clock signal $\phi_1$.

At an interval between $t_3$ and $t_4$, the second internal clock signal $\phi_2$ is held at "L" level. Therefore, the NMOS transistor Mn is OFF. Thereby, the potential $V_{CL}$ of the capacitive load is maintained at "H" level. During the time between $t_3$ and $t_4$, since $\overline{\phi_1}$="H", the third internal clock signal $\phi_F$ is kept "L".

At an interval between time $t_4$ and $t_0'$, the second internal clock signal $\phi_2$ is switched from "L" to "H". Responsive to this level change, the NMOS transistor Mn is turned ON, and thereby the potential $V_{CL}$ of the capacitive load $C_L$ is switched to "L". However, the second internal clock signal $\phi_2$ held at "H" is supplied to the composite gate 26. Therefore, the third internal clock signal $\phi_F$ is maintained at "L". Then the aforementioned operation which is made between time $t_1$ and time $t_4$, is repetitively carried out.

In this manner, according to the aforementioned embodiment, the third internal clock signal $\phi_F$ is newly generated from the first and second internal clock signals $\phi_1$ and $\phi_2$, which are used as timing signals in an internal logic circuit. Particularly, the rising and falling edges of the third internal clock $\phi_F$ are generated on the basis of falling edges of the external clock signal EXCP. As a result, precision in the third internal clock signal $\phi_F$ depends on precision in the external clock signal EXCP. Further, the third clock $\phi_F$ is hardly affected by unevenness of characteristics of devices occurring at the time of manufacturing LSI devices, since the third clock $\phi_F$ is defined by the fall of the clocks $\phi_1'$ and $\phi_2$.

Figure 7:
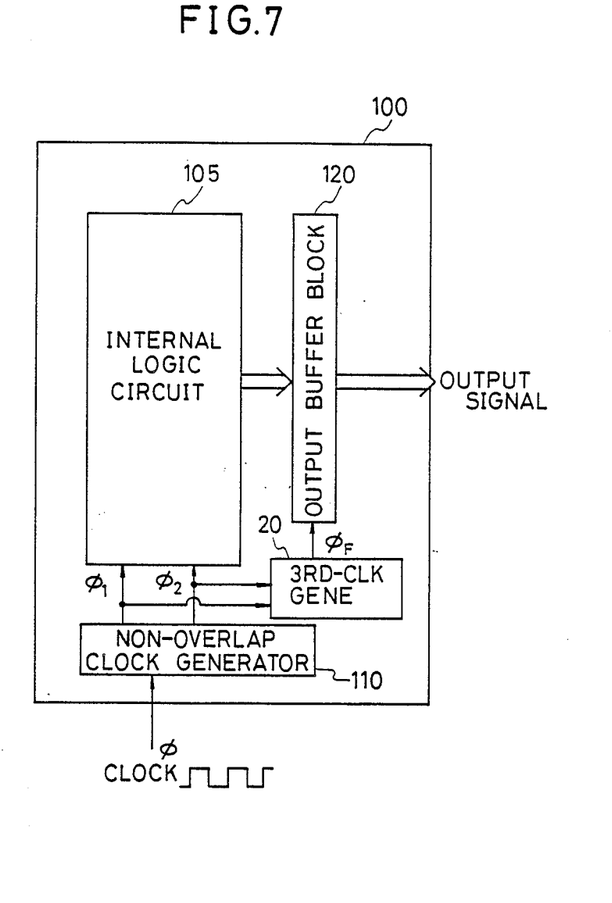
FIG. 7 is a schematic block diagram illustrating the entire structure of the embodiment.

FIG. 7 is a block diagram of an LSI device in which the third-clock generator 20 of FIG. 5 is formed. Referring to FIG. 7, on the semiconductor chip 100, there are formed the internal logic circuit 105, an output buffer block 120 including at least one output buffer circuit BF as shown in FIG. 1), the non-overlap clock generator 110 and the third-clock generator 20. In FIG. 7, the output buffer block 120 and the third-clock generator 20 are separately depicted. However, it is also possible to form the third-clock generator 20 as a structural part of the output buffer block 120.

Figure 8:
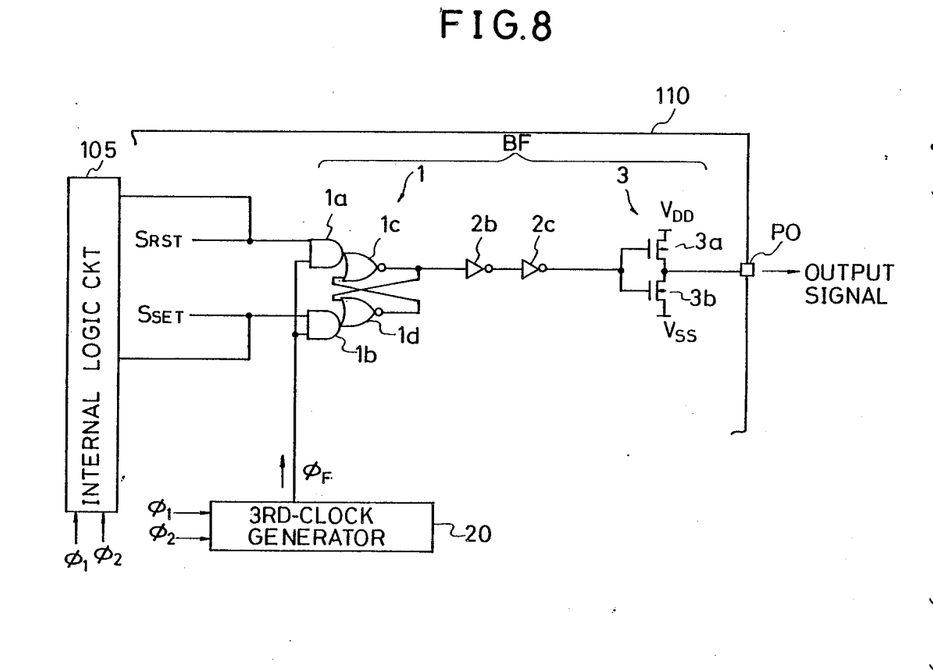
FIG. 8 is a circuit diagram of a part of an output buffer block shown in FIG. 7.
Figure 9:
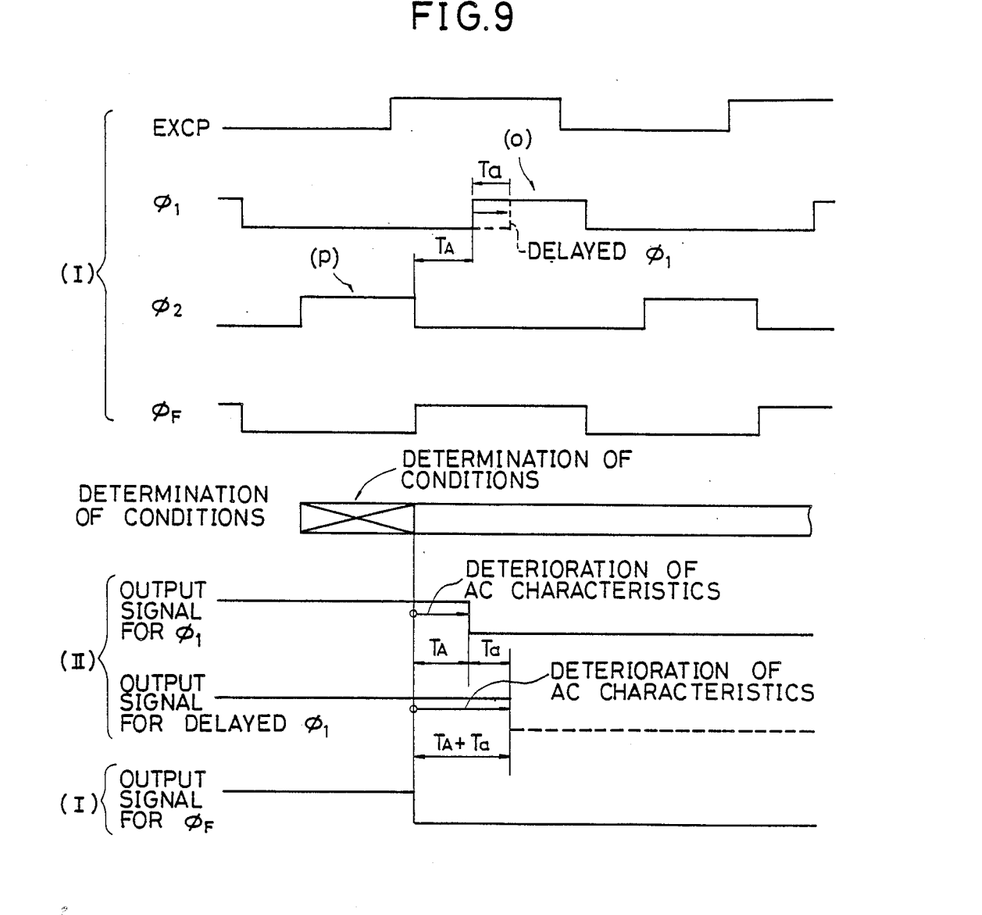
FIG. 9 is a view illustrating waveforms of signals observed in the circuit of FIG. 8, compared with waveforms of signals observed in the conventional output buffer circuit controlled by an internal clock signal generated by the circuit of FIG. 2.

FIG. 8 illustrates a part of the output buffer block 120, together with the internal logic circuit 105 and the third-clock generator 20. In FIG. 8, those parts which are the same as those in FIG. 1 are given the same references. FIG. 9 is a timing chart illustrating operation of the circuit shown in FIG. 8, and illustrating operation of the conventional output buffer controlled by the internal clock signal $\phi_1$ (or $\phi_2$), for the purpose of comparison with the present embodiment. Signals indicated by (I) shown in FIG. 9 relate to the present embodiment, and signals indicated by (II) relate to the conventional art. In operation, it is now assumed that conditions for generating the output set signal $S_{SET}$ are determined in an "H"-level interval of the second internal clock signal $\phi_2$ (indicated by reference (p)). In view of AC characteristics, it is desired that the output signal extracted through the external terminal PO is determined immediately after the above-mentioned conditions for the output set signal $S_{SET}$ are determined. In case where as in the case of the conventional art, the output buffer circuit BF is controlled in an "H"-level interval (o) of the first internal clock signal $\phi_1$ which follows the interval (p) of the second internal clock signal $\phi_2$, the output signal is determined after a time $T_A$ from the time when the above-mentioned conditions are determined. This is because there exists an nonoverlap interval $T_A$ between the first and second internal clock signals $\phi_1$ and $\phi_2$. In the interval $T_A$, both the first and second internal clock signals $\phi_1$ and $\phi_2$ are held at "L" level. The above deteriorates AC characteristics of the output buffer circuit BF. Additionally, since the rising edge of the first clock signal $\phi_1$ depends on the delay circuit, it is liable to be affected by variations in characteristics of the delay circuit. If the delay is increased by time Ta, the output signal is determined with a timing of $T_A+Ta$. This leads to further deterioration of AC characteristics, particularly signal transfer characteristics.

On the other hand, in the case where the output buffer circuit BF is controlled by the third clock signal $\phi_F$, the output signal is determined immediately after the aforementioned conditions are determined. Therefore, AC characteristics obtained by the present invention can be improved by time $T_A$ in the case where no delay occurs in the first internal clock signal $\phi_1$. Even if the first internal clock signal $\phi_1$ is somewhat delayed, AC characteristics can be improved by $Ta+T_A$. That is, the output signal is determined immediately after the conditions for generating the output set signal $S_{SET}$ are determined in the interval (p) of the second internal clock signal $\phi_2$. As a result, it becomes possible to considerably improve AC characteristics of the output buffer circuit BF.

Figure 10:
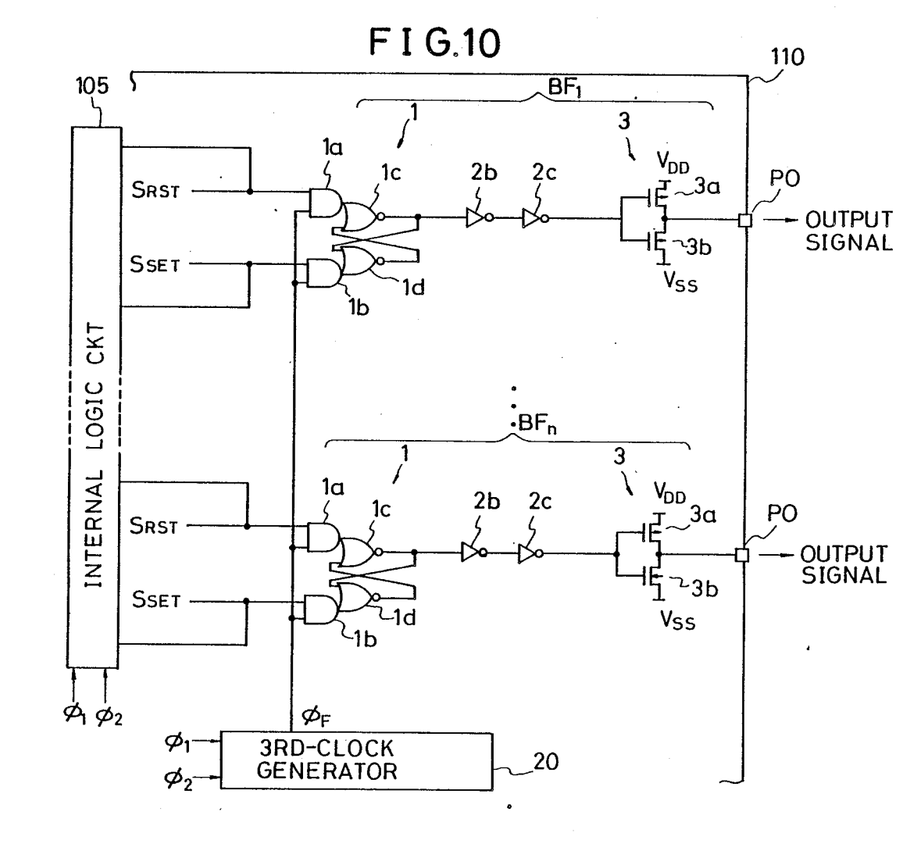
FIG. 10 is a variation of the configuration of FIG. 8.

Actually, there are formed a plurality of output buffer circuits BF in the output buffer block 120. In such a case, the third-clock generator 20 may be provided for every predetermined number of output buffer circuits BF1 through BFn, as shown in FIG. 10. Therefore, there are provided m×n output buffer circuits, m third-clock generators are provided.

Figure 11A:
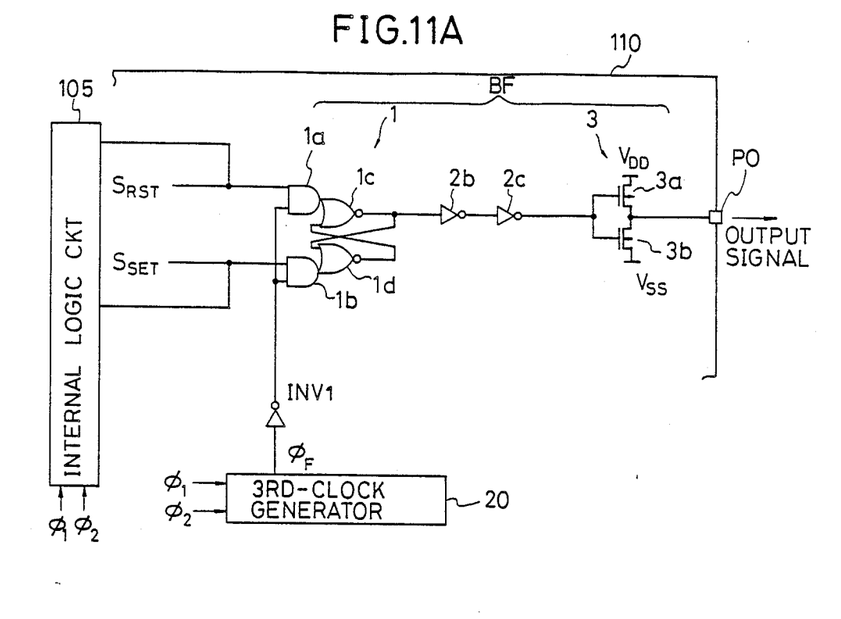
FIGS. 11A through 11C are views illustrating other variations of the configuration of FIG. 8.
Figure 11B:
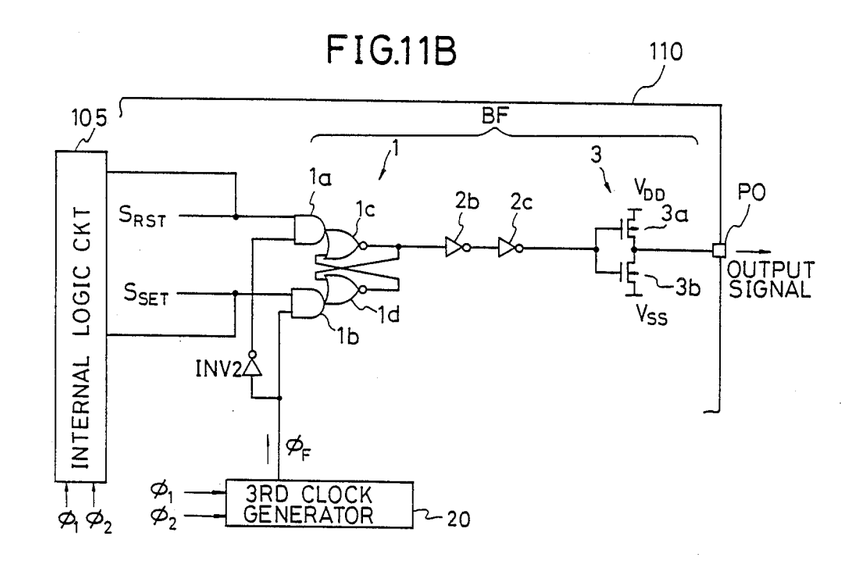
Figure 11C:
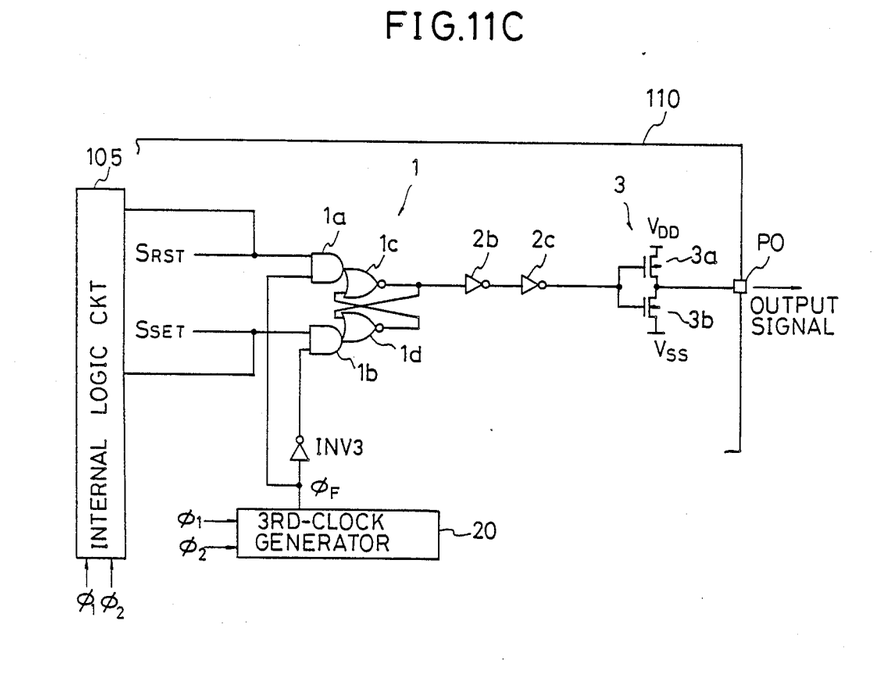

FIGS. 11A through 11C illustrate variations of the embodiment of FIG. 8. In a variation of FIG. 11A, the third clock signal $\phi_F$ is supplied to the flip-flop 1 through an inverter INV1. In a variation of FIG. 11B, the third clock signal $\phi_F$ is directly supplied to the AND gate 1b of the flip-flop 1, and is supplied to the AND gate 1a thereof through an inverter INV2. In a variation of FIG. 11C, the third-clock signal $\phi_F$ is directly supplied to the AND gate 1a of the flip-flop 1, and is supplied to the AND gate 1b thereof through an inverter INV3.

The present invention is not limited to the above-mentioned embodiments, and variations and modifications may be made without departing from the scope of the present invention.

What is claimed is:

1. A semiconductor integrated circuit device comprising:
    internal logic means for carrying out a logic operation and generating an output signal based on said logic operation;
    output buffer means, connected to said internal logic means, for outputting said output signal through an output terminal in synchronism with a clock signal;
    first means for generating a first internal clock signal which falls in synchronism with a falling edge of an external clock signal and for generating a second internal clock signal which falls in synchronism with a rising edge of said external clock signal, said internal logic means carrying out said logic operation in synchronism with said first and second internal clock signals; and
    second means, connected to said first means, for generating a third internal clock which rises in synchronism with the falling edge of said second internal clock signal and which falls in synchronism with the falling edge of said first internal clock signal, said third internal clock signal being supplied, as said clock signal, to said output buffer means.

2. A semiconductor integrated circuit device as claimed in claim 1, wherein said second means comprises inverter means for inverting said first internal clock signal to generate an inverted first clock signal, transistor means having first and second input terminals and an output terminal, for generating a potential signal through said output terminal on the basis of said inverted first internal clock signal supplied to said first input terminal and said second internal clock signal supplied to said second input terminal, and gate means for generating said third internal clock signal on the basis of said inverted first clock signal, said output signal supplied from said transistor means, and said second internal clock signal.

3. A semiconductor integrated circuit device as claimed in claim 2, wherein said transistor means comprises a P-channel metal oxide semiconductor transistor (P-channel MOS transistor) having a drain, source and gate, and an N-channel metal oxide semiconductor transistor (N-channel MOS transistor) having a drain, source and gate, wherein the gates of said P-channel and N-channel MOS transistors are supplied with said inverted first internal clock signal and said second internal clock signal, respectively, wherein the drains of said P-channel and N-channel MOS transistors, and the gate of said P-channel MOS transistor are connected to said gate means, and wherein the source of said P-channel MOS transistor is connected to a positive power source, and the source of said N-channel MOS transistor is connected to a negative power source.

4. A semiconductor integrated circuit device as claimed in claim 3, wherein said gates means comprises an OR gate having first and second input terminals and an output terminal, and a NAND gate having first and second input terminals and an output terminal, wherein the drains of said P-channel and N-channel MOS transistors are connected to the first input terminal of said OR gate, and the second input terminal of which is supplied with said second internal clock signal, the output terminal of said OR gate being connected to the second input terminal of said NAND gate, and wherein the first input terminal of said NAND gate is connected to the gate of said P-channel MOS transistor, and said NAND gate outputs said third internal clock signal through said output terminal thereof.

5. A semiconductor integrated circuit device as claimed in claim 2, wherein said second means comprises series-connected inverters connected to said second input terminal of said transistor means, and said second internal clock signal is supplied to said transistor means through said series-connected inverters.

6. A semiconductor integrated circuit device as claimed in claim 1, wherein said output buffer means comprises a plurality of output buffer circuits connected to said internal logic means, and said second means supplies each of said output buffer circuits with said third internal clock signal.

7. A semiconductor integrated circuit device as claimed in claim 1, wherein said third internal clock signal is directly supplied to said output buffer means.

8. A semiconductor integrated circuit device as claimed in claim 1, further comprising an inverter connected to said second means, wherein said third internal clock signal is supplied to said output buffer means through said inverter.

9. A semiconductor integrated circuit device as claimed in claim 1, wherein said first means comprises a flip-flop having a set terminal, reset terminal, first and second clock terminals for controlling a state of said flip-flop, and output terminal, and a buffer having an input terminal coupled to the output terminal of said flip-flop, and an output terminal connected to an external terminal through which said output signal is output, and wherein said set and reset terminals of said flip-flop are supplied with set and reset signals, respectively, and said first and second clock terminals of said flip-flop are supplied with said third clock signal.

10. A semiconductor integrated circuit device as claimed in claim 9, further comprising an inverter connected to said second means, wherein said third internal clock signal derived from said second means is supplied to said first and second clock terminal of said flip-flop.

11. A semiconductor integrated circuit device as claimed in claim 9, further comprising an inverter connected to said second means, wherein said third internal clock signal derived from said second means is directly supplied to said first input terminal of said flip-flop, and is supplied to said second input terminal of said flip-flop through said inverter.

12. A semiconductor integrated circuit device as claimed in claim 1, wherein said first and second internal clock signals do not overlap each other in view of timing.

13. A semiconductor integrated circuit device as claimed in claim 1, wherein said second means is constructed as a part of said output buffer means.

14. A semiconductor integrated circuit device as claimed in claim 2, wherein said transistor means precharges a capacitive load coupled to the output terminal of said transistor means up to a predetermined voltage, and discharges said capacitive load to a second predetermined voltage.

* * * * *